E. L. HALL.
CAMERA.
APPLICATION FILED NOV. 19, 1908.

965,516.

Patented July 26, 1910.
2 SHEETS—SHEET 1.

WITNESSES

INVENTOR
Edward L. Hall,
BY
ATTORNEYS

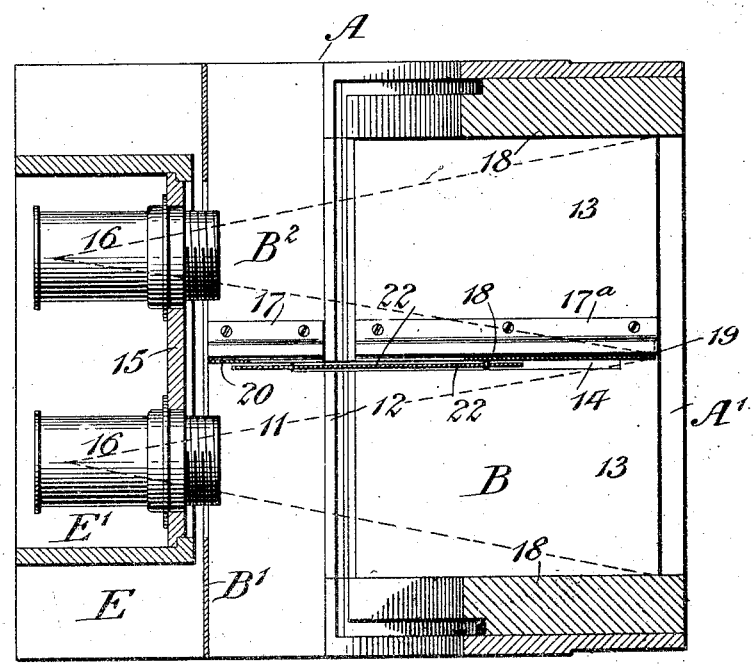

UNITED STATES PATENT OFFICE.

EDWARD LANDER HALL, OF NEW YORK, N. Y.

CAMERA.

965,516.  Specification of Letters Patent.  Patented July 26, 1910.

Application filed November 19, 1908. Serial No. 463,354.

*To all whom it may concern:*

Be it known that I, EDWARD LANDER HALL, a citizen of the United States, residing in New York city, borough of Brooklyn, county of Kings, and State of New York, have invented certain new and useful Improvements in Cameras, of which the following is a specification.

This invention relates to certain improvements in cameras, and has for its object to provide partitioning means of a simple and comparatively inexpensive nature, and of a novel and improved construction, for dividing the interior of the camera box into chambers or compartments adapted to be traversed by the cones of light from independent lenses, in order that overlapping of the images thrown by the respective lenses upon the plate may be avoided when the camera is employed for stereoscopic work.

The invention consists, in part, in means of this general character capable of convenient application to the box of a single lens camera, whereby the interior thereof may be divided into independent chambers or compartments capable of being traversed by the cones of light from independent lenses, in order that such cameras may be quickly and conveniently adapted for use in stereoscopic work.

The invention also consists, in part, in partitioning means especially adapted for use in connection with reflex cameras, wherein such means comprises an adjustable partition member capable of movement to permit the interior of the camera box to be traversed by the mirror, when the same is moved during focusing.

The invention also contemplates certain novel features of the construction, and combinations and arrangements of the several parts of the improved partitioning means, whereby certain important advantages are attained, and the said partitioning means is rendered simpler, less expensive, and otherwise better adapted and more convenient for use, all as will be hereinafter fully set forth.

The novel features of the invention will be carefully defined in the claims.

In order that my invention may be the better understood I will now proceed to describe the same with reference to the accompanying drawings, wherein—

Figure 1:
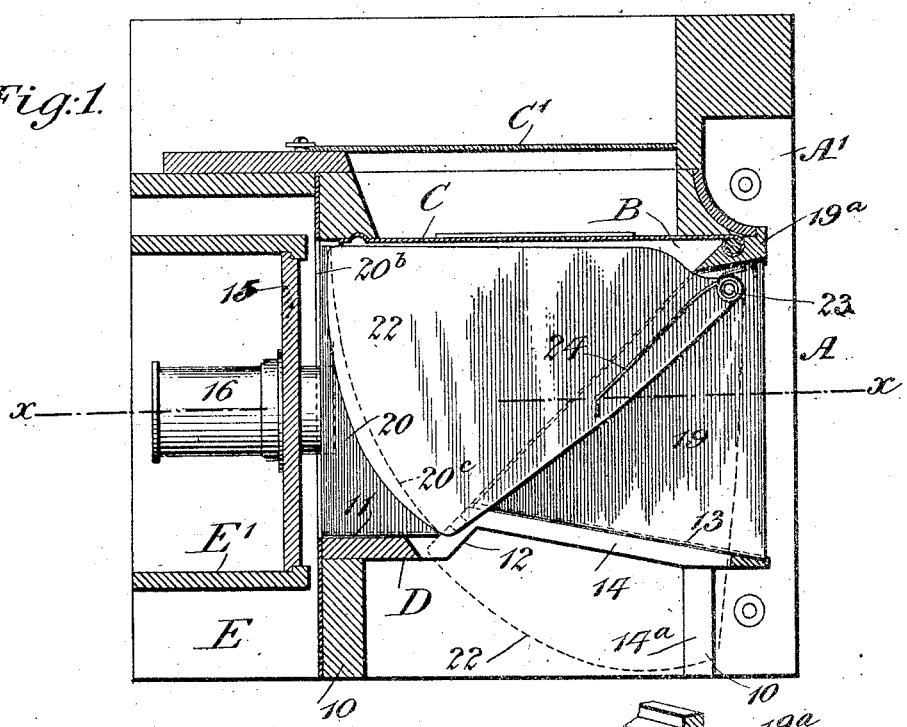
Figure 2:
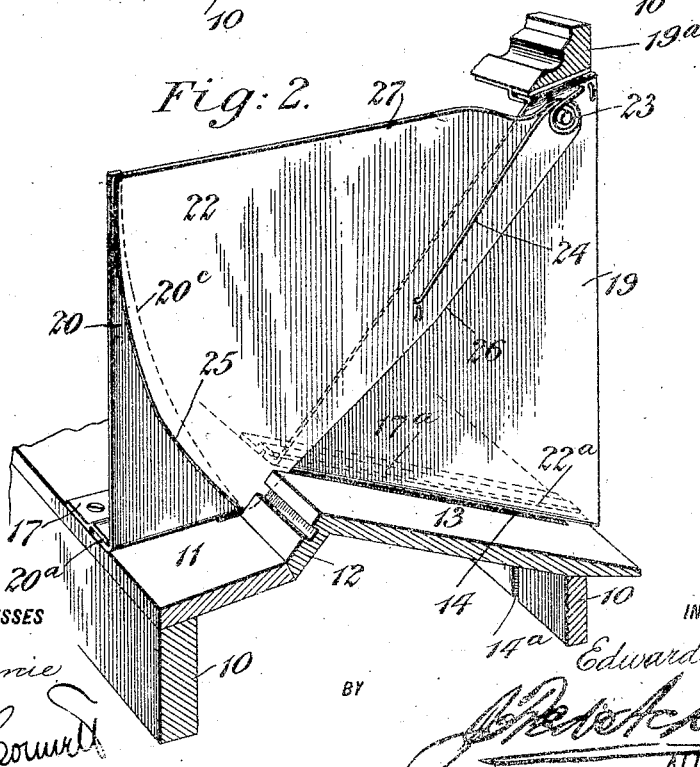

Figure 1 is a fragmentary sectional view taken vertically through the box of a reflex camera showing the improved partitioning means applied thereto, and adjusted in position to divide the interior of the box into independent chambers or compartments such as are desirable for use in stereoscopic work; Fig. 2 is a fragmentary perspective view of certain of the parts illustrated in Fig. 1, portions of the box being broken away to avoid obscuring the partitioning means, and Fig. 3 is a sectional view taken horizontally through the parts shown in Fig. 1, the plane of the section being indicated by the line $x$—$x$ in said figure.

In these views I have shown my improvements applied for use in connection with a reflex camera but, while the partitioning means constructed according to my invention is particularly well adapted for employment in such cameras, I do not desire to be understood as limiting myself to such use, since it will be obvious that the improved partitioning means is capable of employment with good results in connection with cameras of various other types, and for such employment the said partitioning means may be varied, or modified, within the scope of the appended claims, as may be necessary or desirable to accommodate the particular type or types of cameras to which the invention is applied.

In the drawings A represents a camera box having an interior chamber $A^1$ adapted to receive a focal plane shutter, and B represents the well in front of said shutter chamber, normally closed at its top by a focusing mirror C, which, when in raised position, as shown in Fig. 1, fits accurately upon the under-surface of an overhanging frame fitted around the top of the well, so as to prevent leakage of light into said well, but is adapted, during focusing, to be dropped or folded down to an inclined position in order to reflect the image from the lens upon a ground glass plate $C^1$ above the well and, when in such inclined position, is adapted to fit accurately around its edge portions, upon an upwardly and rearwardly inclined surface 12, extended transversely across the base of the well, and upon correspondingly inclined surfaces produced upon the side walls 18, 18 of the well.

The base or floor D of the well, in the special form of camera herein illustrated, is supported upon suitable uprights 10, and comprises said transversely extended upwardly and rearwardly inclined part 12 as its central or intermediate portion, a horizontal front section 11, extended in front of said inclined intermediate portion 12, and from which the latter rises, and a rear section 13, which is inclined downwardly from the rear upper edge of said intermediate section 12 toward the shutter chamber A¹ above referred to.

E represents a lens chamber, which is shown as separated from the well B by a skeleton frame or partition B¹, and E¹ represents the lens box or cell, mounted for movement in said lens chamber E, and provided with a removable lens board or support 15, which, when the camera is desired for stereoscopic use, is fitted with dual lenses 16, 16, as clearly shown in Fig. 3 of the drawings.

14 represents a slotted opening produced in the base or floor D of the well B, at the central part thereof, and extended from the forward section 11 through the intermediate and rear sections 12 and 13, and terminating adjacent to the shutter chamber A¹, and 14ª represents an opening produced in the rear floor support 10, registering with said slotted opening 14, as clearly shown in Figs. 1 and 2, and along one side of said slotted opening 14 are extended guide strips or members 17 and 17ª, the former being secured upon the upper surface of the forward floor section 11, while the strip or member 17ª is secured upon the upper surface of the rear floor section 13, as clearly shown in Figs. 2 and 3.

As shown herein, the partitioning means comprises two insertible partition members 19 and 20, the member 19 being vertically extended above the central part of the rear floor section 13, and being provided with a laterally directed flange 22ª extended along its lower edge and adapted to be slipped beneath the overhanging edge of the rear guide strip or member 17ª, while its upper edge portion is provided with a similar laterally directed integral flange 9, capable of detachable engagement above the pendent flange of a corresponding upper guide strip or member 8, secured upon the upper cross bar or member 19ª of the camera box in alinement with said lower rear guide strip or member 17ª. The rear edge of the rear partition member 19 is vertically extended at the rear part of the well B so as to extend closely adjacent to the shutter within the shutter chamber A¹, while the forward edge of said partition member is inclined to correspond with the inclined forward surfaces of the side members 18, 18 of the well, so as to be adapted for accurate contact upon the under surface of the mirror frame C when the same is dropped into its inclined focusing position.

The partition member 20 is vertically extended above the forward floor section 11 of the well B in alinement with said rear member 19, and is provided at its lower edge with an integral laterally directed flange 20ª, capable of detachable engagement beneath the overhanging edge portion of the forward lower guide strip or member 17, so as to be effectively held in position thereby, its forward edge being vertically extended closely adjacent to the lens board 15, while its rear edge 20ᶜ is shown concaved and so disposed as not to interfere with the free movement of the mirror frame C when the same is moved to and from its inclined focusing position. The improved partitioning means as herein shown also comprises an adjustable shutter or partition member 22, which as herein illustrated is made in a general triangular form, being of such dimensions as to be adapted to close the space between the forward inclined edge of the rear partition member 19 and the rear concaved edge 20ᶜ of the forward partition member 20 when the mirror frame C is elevated into its horizontal raised position to close the top of the well during the interval of exposure. As shown herein, said adjustable shutter or partition member 22 is pivotally connected at its rear upper part, as seen at 23, with the rear upper part of the rear partition member 19 and has its forward and rear edge portions 25 and 26, adapted, when the said member 22 is in operative position, to overlap and fit accurately upon the surfaces of the said forward and rear members 20 and 19, while its upper edge is adapted to be extended closely adjacent to the under surface of the mirror frame C whereby it will be seen that the three members of the partitioning means afford an effective division of the well B into independent compartments alined with the respective lenses 16, 16 and adapted to permit the passage of the cones of light therefrom without liability of leakage of light from one compartment to the other, whereby overlapping of the images upon the plate is effectively prevented.

24 represents a spring, one end whereof has connection with the rear partition member 19, while its opposite end has connection with the adjustable or movable shutter or partition member 22 in such a manner that the tension of said spring is exerted to hold the said shutter or partition member 22 normally in raised position, as shown in Figs. 1 and 2 in order that said shutter or member 22 shall be automatically raised to closing position when the mirror frame C is raised during the interval of exposure. The lower edge portion of said shutter or partition member 22 is herein shown as normally engaged with the forward part of the slotted opening 14 when the said shutter or member is in operative raised position, and the structure and arrangement of the parts is such that when the mirror frame C is dropped or lowered to its inclined position for focusing, the engagement of its under surface against the upper edge of said adjustable shutter or member 22 will operate to press the latter downward and rearwardly along the slotted opening 14, said shutter or partition member moving pivotally against the tension of its spring 24 to the position shown in dotted lines in Fig. 1, wherein it stands during focusing.

Having thus described my invention, what I claim and desire to secure by Letters Patent is—

1. A device for converting a single lens camera box into a stereoscopic camera box, consisting of a partition adapted to be inserted in said box, and a tension-controlled shutter, which shutter normally constitutes a continuation of the upper portion of the partition and is capable of movement to uncover an opening in said partition.

2. In combination with the well section of a reflex camera, the bottom of which well section is provided with guides, and a movable mirror at the top of the well, a partition removably adapted to the well, and a spring-operated shutter for the partition, the movement whereof is controlled by the mirror.

3. In a reflex camera, a removable lens board, a removable partition centering the lens board, a shutter pivoted upon the partition, adapted to open and close an opening therein, and a focusing mirror which controls the opening and closing of the shutter.

4. A camera having a box, removable lens supporting means having independent lenses, and a partition removably inserted in said box and dividing the interior thereof into compartments adapted to be traversed by the cones of light from independent lenses carried by said lens supporting means.

5. A camera having a box, dual photographic lenses therefor an adjustable partition member capable of movement independently of said lenses, into and out of position to divide the interior of said box into compartments adapted to be traversed by the cones of light from said lenses, and means for supporting said adjustable partition member within said camera box.

6. A camera having a box, an adjustable partition member capable of movement into and out of position to divide the interior of said box into compartments adapted to be traversed by the cones of light from independent lenses, dual photographic lenses adapted to project cones of light through the respective ompartments of said box, and means removably engaged with the walls of the camera box and adapted, when inserted therein, to support said adjustable partition member.

7. A reflex camera having a well, a mirror movable to and from focusing position, a partition member capable of movement into and out of the path of said mirror and into and out of position to divide said well into compartments adapted to be traversed by the cones of light from independent lenses, and dual photographic lenses adapted to project cones of light through said respective compartments.

8. A reflex camera having a well, a mirror movable to and from focusing position, a partition dividing the well into compartments adapted to be traversed by the cones of light from independent lenses, and provided with an adjustable member extended adjacent to said mirror and capable of movement to permit movement of the mirror into focusing position, and dual photographic lenses adapted to project cones of light through said respective compartments.

9. A reflex camera having a well, a mirror movable to and from focusing position, a partition member actuated by the mirror and capable of movement into and out of position to divide said well into compartments adapted to be traversed by the cones of light from independent lenses, and dual photographic lenses adapted to project cones of light through said respective compartments.

10. A reflex camera having a well, a mirror movable to and from focusing position, a partition member capable of movement into and out of position to divide the well into compartments adapted to be traversed by the cones of light from independent lenses, dual photographic lenses adapted to project cones of light through said respective compartments and resilient means for actuating said partition member.

11. A reflex camera having a well, a mirror movable to and from focusing position, a partition member movable in unison with said mirror into and out of position to divide the well into compartments adapted to be traversed by the cones of light from independent lenses, and dual photographic lenses adapted to project cones of light through said respective compartments.

12. A reflex camera having a well, a mirror movable to and from focusing position, a partition dividing the well into compartments adapted to be traversed by the cones of light from independent lenses, and provided with an adjustable member extended adjacent to said mirror and capable of movement in unison therewith, and dual photographic lenses adapted to project cones of light through said respective compartments.

13. A reflex camera having a well, a mirror movable to and from focusing position, a pivotally mounted partition member actuated by the mirror and capable of movement in and out of position to divide said well into compartments adapted to be traversed by the cones of light from independent lenses, and dual photographic lenses adapted to project cones of light through said respective compartments.

14. A reflex camera having a well, a mirror movable to and from focusing position, a partition member movable within the well and adapted, when the mirror is in focusing position, to be extended below the same in position to divide the well into compartments adapted to be traversed by the cones of light from independent lenses, and dual photographic lenses adapted to project cones of light through said respective compartments.

15. A camera having a box, dual photographic lenses adapted to direct parallel cones of light therein, and a partition member movable within the box, independently of said lenses, and adapted to divide the interior thereof into compartments adapted to be traversed by the cones of light from said lenses.

16. A camera having a box, dual photographic lenses adapted to direct parallel cones of light therein, and a partition within said box, and provided with a member capable of movement within said box, independently of said lenses and adapted to divide the interior of said box into compartments adapted to be traversed by the cones of light from said lenses.

17. A camera having a box, dual lenses adapted to direct parallel cones of light into said box, a partition member movable within the box and adapted to divide the interior thereof into compartments adapted to be traversed by the cones of light from the respective lenses, and focusing means for the camera in controlling relation to said partition member.

18. A camera having a box, dual lenses adapted to direct parallel cones of light within said box, focusing means capable of movement to focus the camera, and a partition extended within the box and dividing the interior thereof into compartments adapted to be traversed by the cones of light from the respective lenses and provided with a member capable of movement in unison with the movement of the focusing means.

In witness whereof I have hereunto signed my name this 5th day of November, 1908, in the presence of two subscribing witnesses.

EDWARD LANDER HALL.

Witnesses:
 FRED ACKER,
 ELIZABETH ACKER.